United States Patent [19]
Greenblatt
[11] 3,801,201
[45] Apr. 2, 1974

[54] METHOD AND APPARATUS FOR AUTOMATICALLY COMBINING TEXTUAL AND GRAPHIC MATTER

[76] Inventor: Stanley L. Greenblatt, 12613 Cedarbrook Ln., Laurel, Md. 20810

[22] Filed: Dec. 19, 1972

[21] Appl. No.: 316,548

[52] U.S. Cl. .................... 355/40, 95/4.5 R, 355/77
[51] Int. Cl. .................... G03b 41/00
[58] Field of Search .................... 355/40–43, 355/46, 54, 64–66, 77; 95/4.5, 1.1; 352/47

[56] References Cited

UNITED STATES PATENTS

| | | | |
|---|---|---|---|
| 3,600,089 | 8/1971 | Walter | 355/40 X |
| 3,626,824 | 12/1971 | Kolb et al. | 355/40 X |

*Primary Examiner*—Samuel S. Matthews
*Assistant Examiner*—Richard A. Wintercorn
*Attorney, Agent, or Firm*—Oblon, Fisher, Spivak, McClelland & Maier

[57] ABSTRACT

A method and an apparatus for automatically combining textual and graphical subject matter is disclosed. According to the invention, a master magnetic tape is initially prepared which contains all desired textual material as well as appropriately coded references to graphical material, such as photographic illustrations, which are to be combined with the textual material. The master tape is then converted to a film strip record of the textual material and an edit tape is also prepared on which all coded information pertaining to the graphical material is stored. The edit tape may be used to drive a card sorter which separates a selected group or deck of aperture cards identified on the master tape from an aperture card library. The selected deck of cards is then delivered to an automatic graphics device wherein the images contained in the aperture cards are transferred to a graphics film strip under control of the edit tape. This film strip is then combined with the film strip of textual material in a film merging machine to produce a final film containing the desired combination of material. This film may serve as the final output, or may be converted into appropriate printing plates for preparing a conventional printed text. Alternatively, the edit tape may be omitted, and the card sorting and film preparation procedures may be carried out directly from the master tape using an appropriate control device. In general, the apparatus of the present invention includes a combination of well known and commercially available devices. However, the automatic graphics device is unique to the present invention, and its structure is disclosed in detail.

18 Claims, 7 Drawing Figures

METHOD AND APPARATUS FOR AUTOMATICALLY COMBINING TEXTUAL AND GRAPHIC MATTER

BACKGROUND OF THE INVENTION

1. Field of the Invention

This invention relates generally to a method and apparatus for preparing an illustrated textual record, and more particularly to a method and apparatus for automatically combining textual and graphic subject matter.

2. Description of the Prior Art

Although the automatic data processing art has developed rapidly in the field of processing textual material, and has produced numerous excellent apparatuses for converting textual material from one form of record to another, it has generally lagged in providing inexpensive but high resolution devices for automatically combining textual and graphic materials.

Some fully automated devices, such as the Linatron (TM) are presently in existence. However devices of this type are either extraordinarily expensive, or they provide poor resolution and low quality graphics. In general, the most commonly used fully automated devices require the conversion of graphical images into dot patterns for purposes of reproduction, and thus, unless extremely high resolution dot patterns are produced, lack the resolution quality of photographic reproduction. Machines which produce very high resolution dot images are extremely expensive, and are also somewhat difficult to use in laying out the textual and graphical material to be combined.

Other techniques for combining textual and graphical material which rely on film and photographic reproductions are also well known. However existing techniques of this type also include a number of substantial disadvantages. For example, one commonly used technique of preparing illustrated texts is to first prepare a film strip containing all textual material set out in the proper format. In order to add pictures or other graphical matter to the textual material, it is necessary to print out the textual material in full size and subsequently "strip in" the necessary graphical material. The "stripping in" process requires a tremendous amount of time consuming labor as each photograph or illustration is laboriously cut and pasted into the appropriate position in the printed out textual material. The entire printed out text with the appropriate graphical material "stripped in" must then be re-photographed in order to produce a master film from which appropriate printing plates can be prepared. Naturally the resolution of the final master film and any printing plates prepared from it is also reduced by the need for printing and re-photographing the textual material. Thus photographic methods of this type are extremely inconvenient since they require a substantial amount of manual labor in combining graphical and textual materials, and since the resultant product is of relatively low resolution considering the effort involved.

An even more emphatic illustration of the inefficiencies inherent in conventional photographic reproduction techniques exists in cases where the desired final output is a film or microfilm master. In such cases, illustrations and graphical material can only be added to textual material by the process steps of printing out the textual material, manually adding the photographs or illustrations to it, and re-photographing the whole. Naturally, the steps of printing, manually combining the graphical and textual materials, and re-photographing the combined materials are both extremely expensive and time consuming relative to the cost and time required to produce an initial microfilm master of the textual material alone. Accordingly, many commercial users who are interested only in microfilm masters, rather than in printed text, have been reluctant to use any type of graphical matter in combination with filmed texts. This greatly reduces the information handling ability of microfilmed texts, since graphics obviously add considerable information to any written text. Accordingly the inconvenience and high cost of adding graphical material to microfilmed texts has substantially curtailed the commercial utility of such microfilmed texts.

Many other similar circumstances exist which emphasize the need for a truly economical, high resolution technique for automatically combining textual and graphical materials to produce a film master which can be used as a final product in itself, or which can be used to produce plates for preparing a publication as the final output. In any case, it is clear that a need exists for an automated device for combining textual and graphical materials which produces a high resolution output at low cost.

SUMMARY OF THE INVENTION

Accordingly one object of this invention is to provide a novel method for automatically combining textual and graphical material.

Another object of this invention is to provide a novel method of automatically combining textual and graphical material on film.

Yet another object of this invention is the provision of a novel method for automatically combining textual and graphical material to produce a high resolution output at low cost.

A still further object of this invention is the provision of a novel apparatus for automatically combining graphical and textual material.

A still further object of this invention is the provision of a novel apparatus for automatically combining textual and graphical material on photographic film.

A still further object of this invention is to provide a novel apparatus for automatically combining textual and graphical material to provide a high resolution output at low cost.

Another object of this invention is the provision of a novel apparatus for preparing a composite film of graphical matter for combination with a film containing textual material.

Another object of the present invention is the provision of a novel apparatus for preparing a composite film of appropriately sized and oriented graphical material from a plurality of aperture cards.

Briefly, these and other objects of the present invention are achieved by first preparing a master tape containing desired textual material and coded information identifying desired graphical material to be added to the text. The graphical material is initially assembled in the form of a library of aperture cards containing information in photographic form. The master tape is then converted to a properly arranged film text and all of the coded information pertaining to the graphics to be added to the film text is separated from the textual material. The coded information is used to select the appropriate aperture cards from the library using a card sorter. The selected graphics deck is then delivered to an automatic graphics device which prepares a composite film record of all of the graphical images contained in the aperture cards contained in the graphics deck. These images are appropriately sized and oriented on the film in accordance with the instructions contained in the coded graphics information. The composite graphics film is then merged with the text film in a film merger. The output of the film merger is a master film on which the textual and graphical materials are combined. This master film may be used as a final output, or may be used to prepare conventional printing plates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
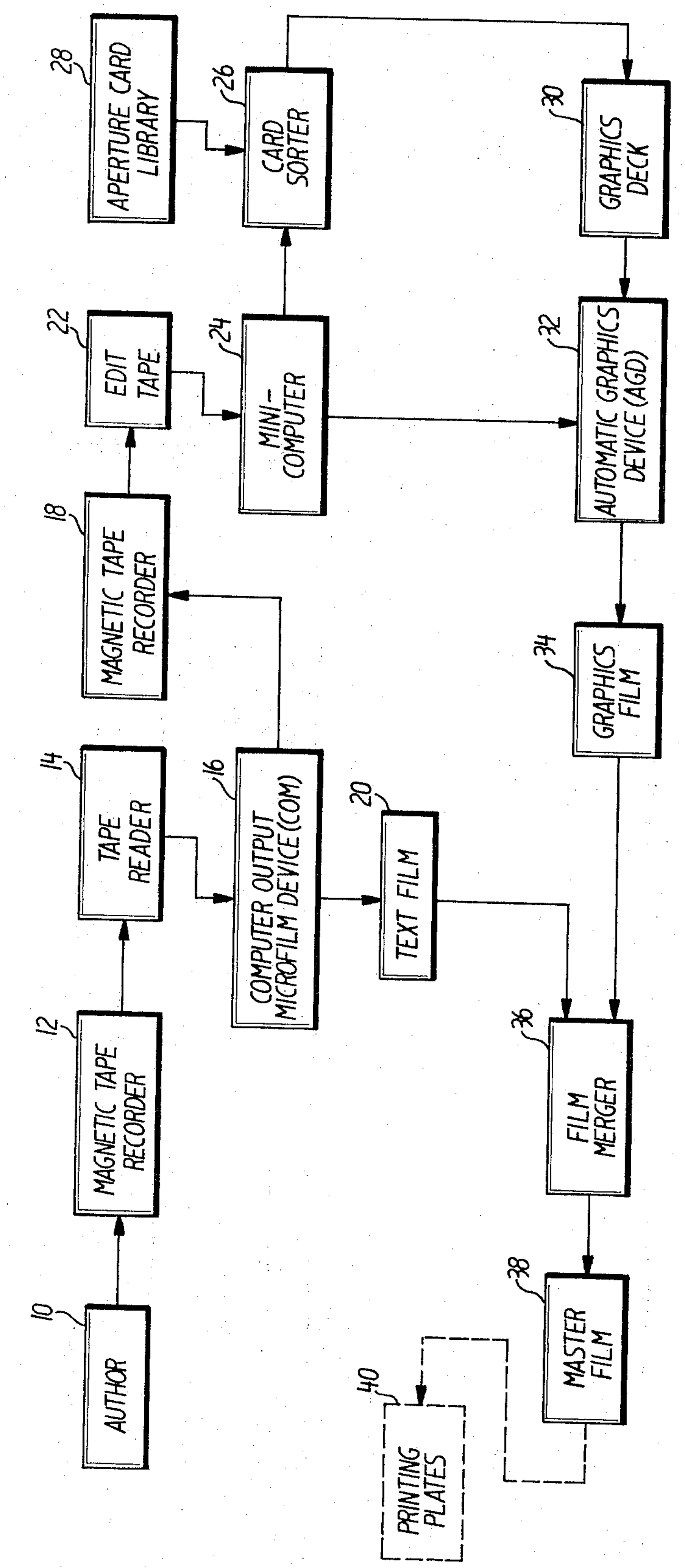
FIG. 1 is a block diagram illustrating the method and apparatus of one embodiment of the present invention.

Referring now to the drawings, wherein like reference numerals designate identical or corresponding parts throughout the several views, and more particularly to FIG. 1 thereof, a first embodiment of the present invention is illustrated in the form of a block diagram. An author 10 is illustrated as supplying information to a magnetic tape recorder 12. It will be understood that the author 10 may be a person who creates or edits the work to be prepared, an apropriately programmed computer, or the output of some other editting or information arranging system. The output produced by the author consists of all information necessary to prepare a fully illustrated text. Thus for example, the author may prepare all necessary textual information, inserting codes identifying particular graphic materials where desired. These codes identify individual graphic images, and also indicate the size and positioning of each graphic image. It will of course be understood that information of this type can be supplied directly from a computer, or an equivalent type of appratus, particularly in situations where the illustrated text to be prepared constitutes an updated version of a catalogue or other similar publication. In such cases, the information format is readily available, and it is only necessary to change or modify the information content of the publication. However, the system to be described can also prepare entirely new publications, although new publications require substantially more analysis by the author than publications which are merely being updated.

The information being supplied by the author is converted to a machine readable record, preferably magnetic tape in the present embodiment of the invention, by the magnetic tape recorder 12. The output of the magnetic tape recorder 12 is then applied to a tape reader 14, the output of which is coupled to a computer output microfilm device. (COM) 16. The computer output microfilm device is a conventional device, many of which are presently available commercially from such corporations as the *Bendix Corporation*, *Burroughs Corporation*, *Eastman Kodak Company*, *RCA* and numerous other companies. The devices manufactured by these and other companies are described in detail in *Computer Output Microfilm*, second edition by Don M. Avedon, N. M. A. Monograph No. 4, published by the *National Microfilm Association*, 8728 Colesville Road, Silver Springs, Md. Further information concerning specific technical aspects of commercially available computer output microfilm devices is set forth in *Auerbach on Computer Output Microfilm*, published by the Auerbach Publishers, New York (1972). The computer output microfilm device converts the input information into an output film strip. Different film sizes are available, such as 16 and 35 mm film. The devices are also capable of arranging textual material in selected formats, and paginating the information according to a predetermined format. The desired format information is supplied by the author on the previously discussed magnetic master tape. In accordance with the prescribed format, the COM device 16 prepares a film text having appropriate spaces left therein for the insertion of graphic matter called for on the master tape. The COM device 16 is also coupled to a magnetic tape recorder 18. The information fed to the magnetic tape recorder 18 by the COM 16 is equivalent to the information stored on the magnetic master tape less information relating to the content and arrangement of the textual material. Thus the information fed to the magnetic tape recorder 18 relates exclusively to the graphic material specified in the magnetic master tape. More particularly, this information includes identifying numbers of specific graphical illustrations, as well as the size, placement and location within the textual material of the various graphical materials. Separation of this information from the textual information contained on the magnetic master tape is simplified by appropriate coding of information pertaining to graphical subject matter. Thus, the COM device 16 recognizes the unique coding relating to graphical subject matter and passes this information to the magnetic tape recorder 18, while the text film 20 is being prepared.

The output of the magnetic tape recorder 18 is an edit tape 22 which, as mentioned above, contains all information from the magnetic master tape relating to the graphic material which is to be combined with the textual material prepared by the author. Thus the edit tape lists the pages requiring graphics, identifies each particular graphical image by number, indicates the image size requested by the author and indicates the location on a particular page reserved by the COM device 16 for the particular image.

The information stored on the edit tape 22 is fed to a mini-computer 24, which is appropriately programmed in a conventional manner, as will be described in more detail presently. The mini-computer 24 first separates the image identification numbers contained on the edit tape 22 which specify the particular graphical images selected by the author 10. This information is fed to a card sorter 26 which contains an aperture card library 28. The aperture card library preferably consists of conventional machine manipulatable cards carrying 35 mm film images. Naturally many other types of devices may be used to store the graphical information, such as film cartridges, roll film and various other types of aperture cards. However, conventional aperture cards are preferred according to the present invention in view of the wide spread commercial availability of machines for handling and retrieving them. Furthermore, aperture cards are somewhat more desirable than film cartridges or roll film in storing graphical images because of the random access retrieval capabilities they possess. The aperture card library may be prepared either before or after the author 10 prepares the magnetic master tape. However, the system and apparatus of the present invention is most convenient and economical to use after an aperture card library has been prepared.

The identification numbers of the graphical images selected by the author are fed to the card sorter 26 by the mini-computer 24, as mentioned above. The card sorter uses these numbers to select the appropriate cards from the aperture card library 28 by reading the identifying numbers punched into the aperture cards contained in the library. As a result of this procedure, a graphics deck 30 is selected by the card sorter 26, and is fed to an automatic graphics device (AGD) 32. In practice, the card sorter can be mechanically coupled to the AGD 32 to automatically deliver the appropriate graphics deck 30 to the AGD. Naturally, it is also possible to manually remove the graphics deck 30 from the card sorter 26 and load it into the AGD 32. The AGD operates under the control of the mini-computer 24 to prepare a film strip to which the graphical images contained on the aperture cards in the graphics deck 30 are transferred. In transferring the images, the AGD sizes and locates the images according to the format prescribed by the author 10, as will be more fully explained hereinafter. The output of the AGD 32 is a graphics film 34 of substantially the same type as the text film 30 generated by the COM 16. For example, both the text film 20 and the graphics film 34 may be conventional 16 mm or 35 mm films.

Both the text film 20 and the graphics film 34 are then fed to a film merger 36 where the images contained on them are interleaved to produce a final master film 38 which contains all of the textual material and graphical material combined in the manner specified by the author 10. The master film may then be used to form printing plates 40, or may be retained as a final product, as desired.

With the exception of the AGD 32, the details of which will be explained hereinbelow, all components of the above-described system are conventional and commercially available. Although many different models and types of commercially available equipment can be used in practicing the above-described invention, the preferred equipment is as follows. All magnetic tape handling equipment, including recorders and readers are preferably IBM model 729 tape stations. Similarly, the aperture card reading and transporting mechanism is preferably an IBM model 56 verifier. The mini-computer 24 is preferably an IBM model 1401 electronic computer, although smaller electronic computers of either IBM or other manufacturers can also be used. The COM device 16 may be a device manufactured by any of the corporations referenced above. For example, the COM device may be a VideoComp (TM) manufactured by RCA. The film merger 36 is preferably a device of the type described in U.S. Pat. No. 3,600,089, issued Aug. 17, 1971 to Gerard O. Walter, and assigned to RCA Corporation.

It will be understood that although the block diagram of FIG. 1 has been described in terms of a system comprised of interconnected mechanical and electronic components, the block diagram is also intended to be interpreted as illustrating a method of combining textual and graphical materials. Thus the function performed by each of the apparatuses illustrated in the block diagram represents a step in the method of the present invention.

Figure 2:
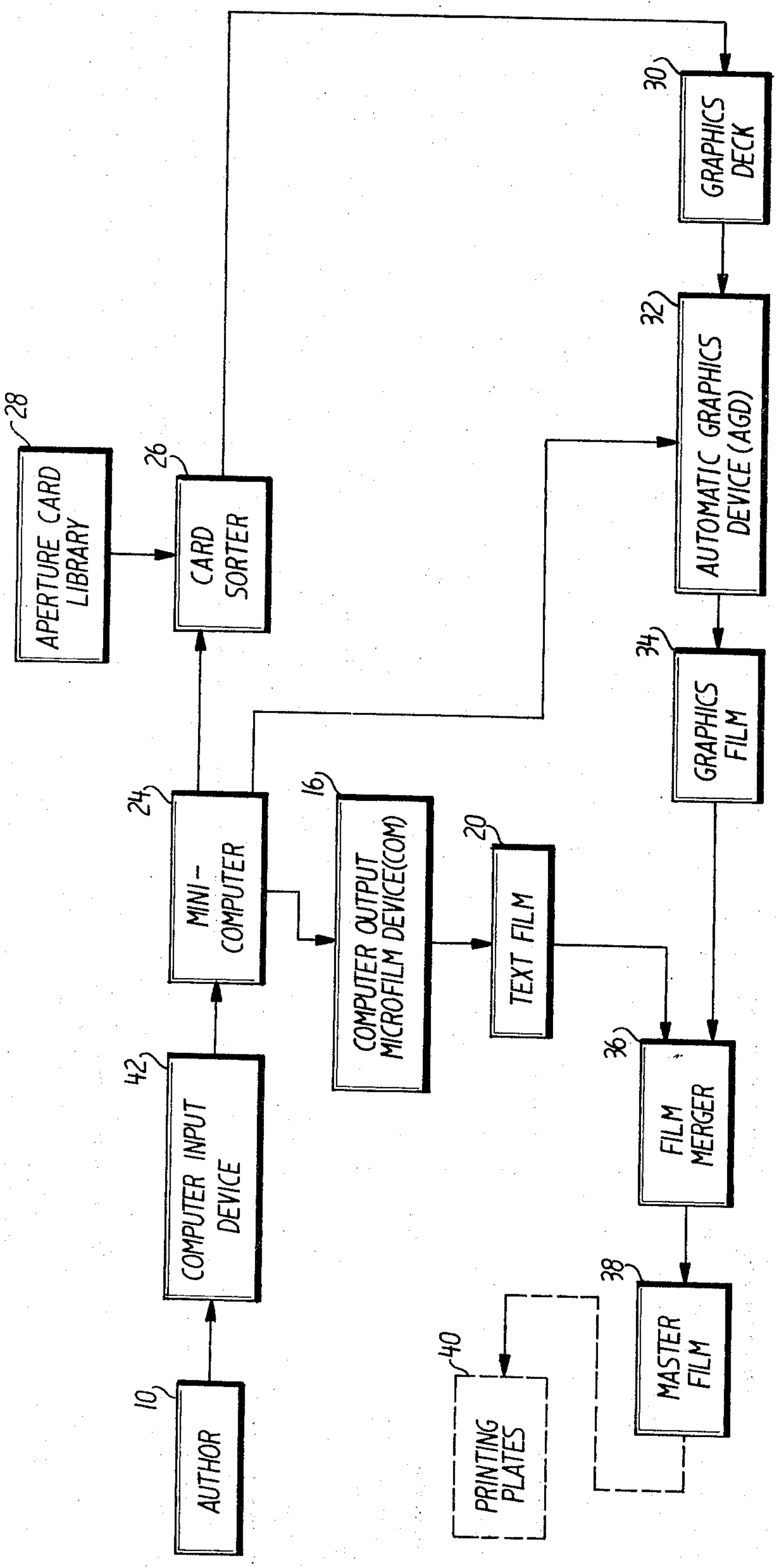
FIG. 2 is a block diagram illustrating the method and apparatus of a second embodiment of the present invention.

Referring now to FIG. 2, a system and method is illustrated in block diagramtic form which is an alternative to that illustrated in FIG. 1. The arrangement illustrated in FIG. 2 is similar to that of FIG. 1 with the exception that the mini-computer 24 is used to accomplish several functions in addition to those required in the system of FIG. 1. Accordingly, in FIG. 2 the need for an edit tape has been eliminated. More particularly, in FIG. 2 the author 10 supplies all necessary information to a computer input device 42. The computer input device 42 may be a magnetic tape recorder, as illustrated at 12 in FIG. 1, or it may be a punched card, punched tape, or any other conventional and commercially available type of apparatus for putting information into a machine readable format. The information placed into the computer input device 42 is then fed directly to the mini-computer 24, which in turn directly controls the COM device 16, the card sorter 26 and the AGD device 32. Accordingly, it is clear that although the mini-computers illustrated in FIGS. 1 and 2 may be structurally identical, they are programmed somewhat differently. The programming differences will be described presently. Basically, the programming difference between the apparatuses of FIGS. 1 and 2 resides in the fact that the mini-computer of FIG. 2 is programmed to separate the textual material from the graphics identification and specification material, run the COM device 16 while simultaneously operating the card sorter 16 and subsequently drive the AGD 32. The net operational result is identical to that of the system and method illustrated in FIG. 1, and the hardware utilized may also be identical.

Although in the generalized apparatus described above it is possible for an author to select any size and location of a graphical image on each page of textual material, it is generally unnecessary in practice to provide an infinitely variable selection of image sizes and locations. In fact, two different image sizes are generally sufficient in practice, and approximately six or eight image locations are also sufficient. Accordingly, by limiting the number of image sizes and positions which can be selected by the author, a highly practical system and method can be attained at relatively low cost and using a minimum of hardware.

Figure 3:
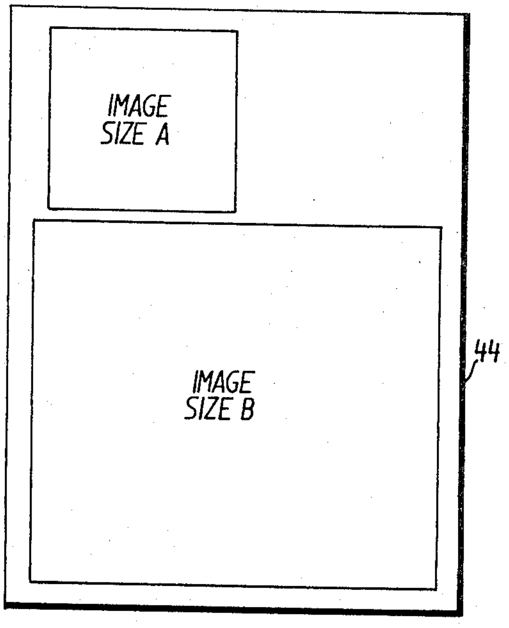
FIG. 3 is an illustration of various graphics arrangements on a typical text page.

In this regard, attention is directed to FIG. 3 wherein a typical text page 44 is illustrated. It will be understood that the page 44, which is illustrated as having the dimensions of the standard 8½ × 11 inch paper sheet, could be substantially any size. Naturally, the page would have substantially smaller dimensions when in the form of a film frame. Two image sizes, designated size A and size B are illustrated in FIG. 3. Image size A represents one-sixth of a page, while image size B covers two-thirds of a page, or essentially a full page where descriptive legends are used in combination with an image. The smaller image size A can be positioned either in the right or left hand columns of the page 44, or any one of three vertical positions. Similarly, the size B image can be located either toward the lower portion of the page 44 or toward the upper portion thereof. Naturally, any number of further variations in both image size and positioning can be attained by slight modifications made to the AGD device 32, as will be explained in more detail hereinafter.

Figure 4:
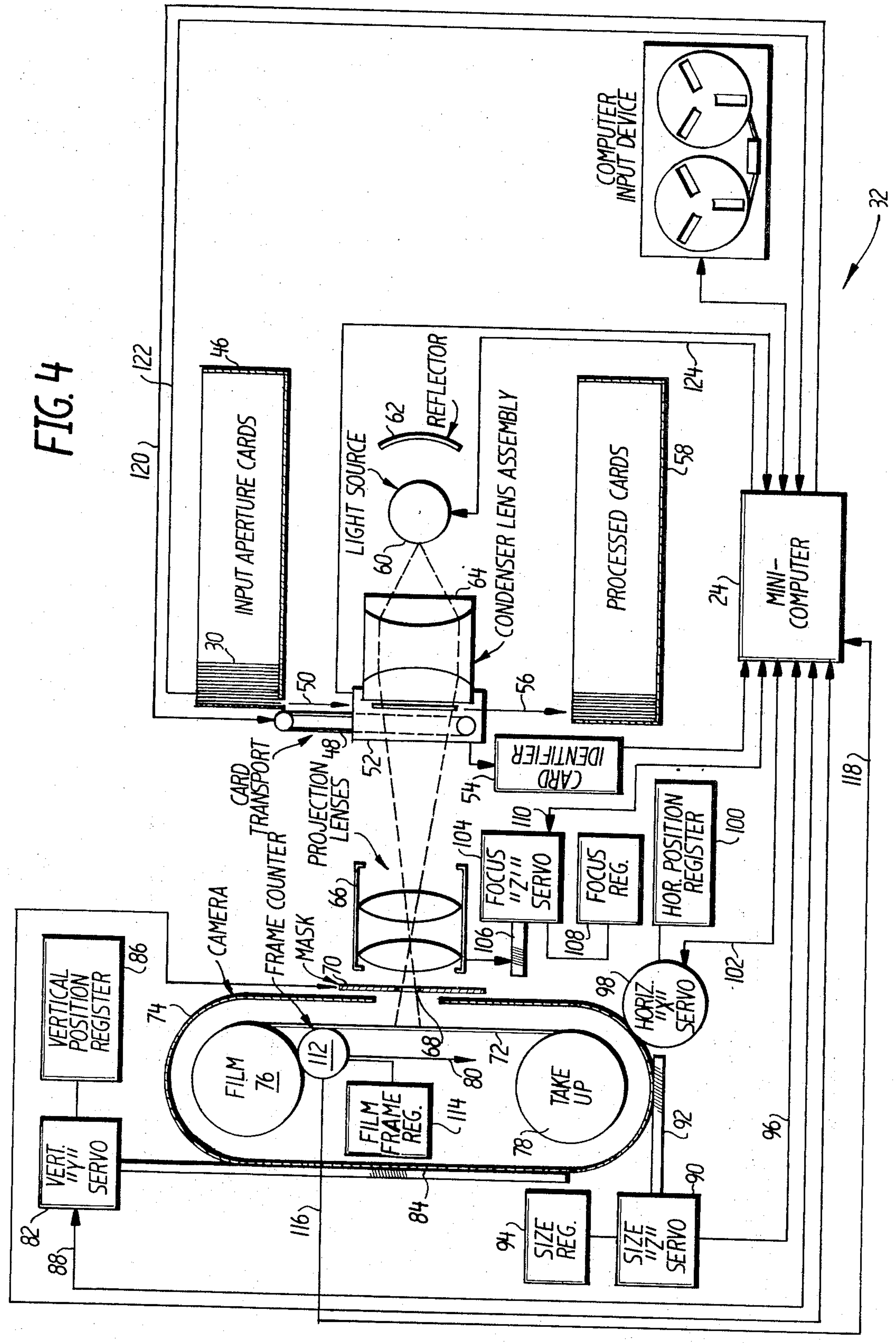
FIG. 4 is a schematic diagram of an automatic graphics device according to the present invention.

Referring now to FIG. 4, a detailed schematic diagram is presented of the AGD 32, which was previously described only in general terms. Of the devices included in the systems set forth in the block diagrams of FIGS. 1 and 2, only the AGD 32 is not available commercially. As shown in FIG. 4, the AGD 32 includes three basic subsystems, namely an aperture card handling mechanism, a projection holder and focusing device and an image size and placement selecting mechanism. The aperture card handling mechanism includes an input card hopper 46 into which the graphics deck 30 from the card sorter 26 is loaded. A card transport mechanism 48 feeds the aperture cards in the input card hopper 46 in the direction of an arrow 50 to a reading and projection station 52. The cards are momentarily stopped at the reading and projection station 52, at which time a card identifier 54 reads the identifying number or code punched into each card, and feeds this information to the mini-computer 24. The card identifying or code number is then compared with information stored in the mini-computer to determine whether the appropriate card is positioned in the reading and projection station 52. After each card has been fully processed, it is transported in the direction of an arrow 56 by the card transport mechanism 48 to a processed card hopper 58, where it may be temporarily stored, for eventual return to the aperture card library 28. Mechanical details of the card handling mechanism, including the motor and clutch arrangement, and all of the mechanical controls involved are illustrated and described in detail in U.S. Patent No. 3,225,649, issued Dec. 28, 1965 to Timares et al.

As each aperture card reaches the reading and projection station 52, it is temporarily held in a precise position so that the image carried by the card is correctly aligned with the optical system contained in the AGD device. This optical system includes a projection light source 60, which may be a high intensity air cooled bulb, for example, backed by a suitable reflector 62. The projection light source 60 projects a light beam through a condenser lens assembly 64, which in turn projects the condensed light beam through the image portion of the aperture card positioned in the reading and projection station 52. The light beam transmitted through this image then impinges upon a projection lens assembly 66 containing one or more projection lenses, which in turn focuses the image through an aperture 68 in a mask 70 onto a film strip 72 mounted in a camera 74. Again, the specific structural details of this optical system may be substantially the same as those illustrated in the above referenced Timares et al. patent. The film strip 72 is, of course, raw film, and is initially held on a feed reel 76, and after exposure is stored on a take-up reel 78. Thus the film moves in the direction of an arrow 80 past a suitable exposing aperture in the camera 74. The exposing aperture may also be essentially identical to that illustrated in the Timares et al. patent, and exposure control is also preferably the same as that disclosed in the Timares et al. patent. The camera 74 may be any one of a large variety of cameras suitable for the task required. Several models of suitable cameras are manufactured by the *Vought Division of Computer Equipment Corporation*, for example.

The image size and placement selecting mechanism includes a plurality of servos which are operated according to instructions received from the mini-computer 24. More particularly, a vertical or Y servo 82 is mechanically coupled to the camera 74 by means of a threaded rod 84, for example, to adjust the vertical positioning of the camera 74. The vertical adjustments will, naturally, be extremely small, and therefore it is necessary that the servo and threaded rod assembly permit small and extremely precise adjustments of the camera position. A vertical position register 86 is coupled to the vertical position servo to provide a digital indication of the vertical position of the camera 74. The vertical servo is coupled via a vertical control line 88 to the mini-computer 24, whereby the vertical position of the camera 74 can be monitored and controlled by the mini-computer 24. A size or Z servo 90 is also coupled to the camera 74 by a threaded rod 92. The position of the size servo is monitored by a size register 94 which is coupled to the size servo. The size servo moves the camera 74 along an axis which is perpendicular to the plane defined by each aperture card as it is held in the reading and projection station 52. Thus the size servo 90 may be used to move the camera 74 slightly closer to the reading and projection station 52, whereby the image formed on the film strip 72 is reduced. Similarly, the size servo 90 can be used to move the camera 74 in the opposite direction to enlarge the size of the image formed on the film strip 72. Again, the size register 94 monitors the operation of the size servo 90, and accordingly indicates in digital form the position of the camera 74 along the above-described axis. Accordingly, the size register 94 provides an indication of the size of the image which will be formed on the film strip 72. A size control line 96 couples the size servo 90 and size register 94 with the mini-computer 24, to permit the mini-computer to control and monitor the image sizing equipment. A horizontal or X servo 98 is provided to move the camera 74 into and out of the plane defined by FIG. 4, whereby the lateral position of the image formed on the film strip 72 can be adjusted. A horizontal position register 100, coupled to the horizontal servo 98 provides a digital indication of the position of the camera 74, and accordingly indicates the lateral position of the images formed on the film strip 72. As with the other servos, the horizontal servo is coupled to the mini-computer 24 by a horizontal control line 102 to permit computer control of the lateral positioning of images on the film strip 72. A focusing servo 104 is coupled by means of a threaded rod 106 to the projection lens assembly 66 to permit computer controlled focusing of the images projected on the film strip 72. The position of the focusing servo is monitored by a focusing register 108, and the focusing servo is coupled to the mini-computer 24 over a focusing control line 110.

A frame counter 112 is mounted within the camera 74 and is coupled to the film strip 72 to provide an indication of the precise film frame on which each image from each aperture card is projected. A film frame register 114 is coupled to the frame counter 112 to provide a digital indication of the output thereof. The film frame information is coupled to the mini-computer 24 over a film frame counter line 116. The mask 70 is also controlled by the mini-computer 24, by means of a mask control line 118. The mini-computer 24 also controls the operation of the card transport mechanism over a line 120, and further controls the feeding of aperture cards through a feed control line 122. If desired, the projection light source 60 can also be controlled directly by the mini-computer 24, and a projection light source control line 124 is shown in FIG. 4.

Figure 5A:
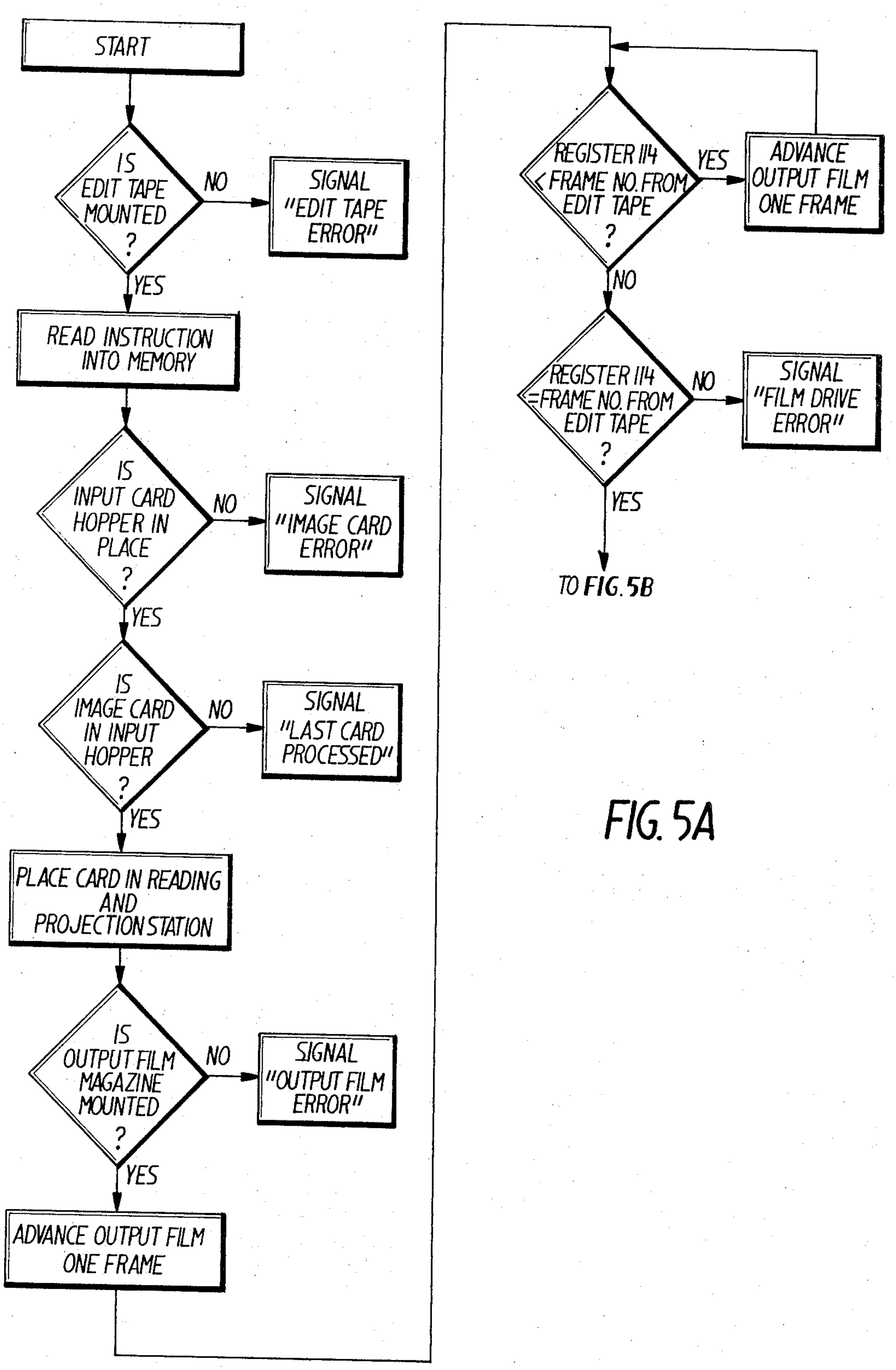
FIG. 5 is a flow chart illustrating one program for the mini-computer illustrated in the block diagram of FIG. 1; and, FIG. 6 is a modified flow chart illustrating the program used with the mini-computer illustrated in the embodiment of the invention shown in FIG. 2.
Figure 5B:
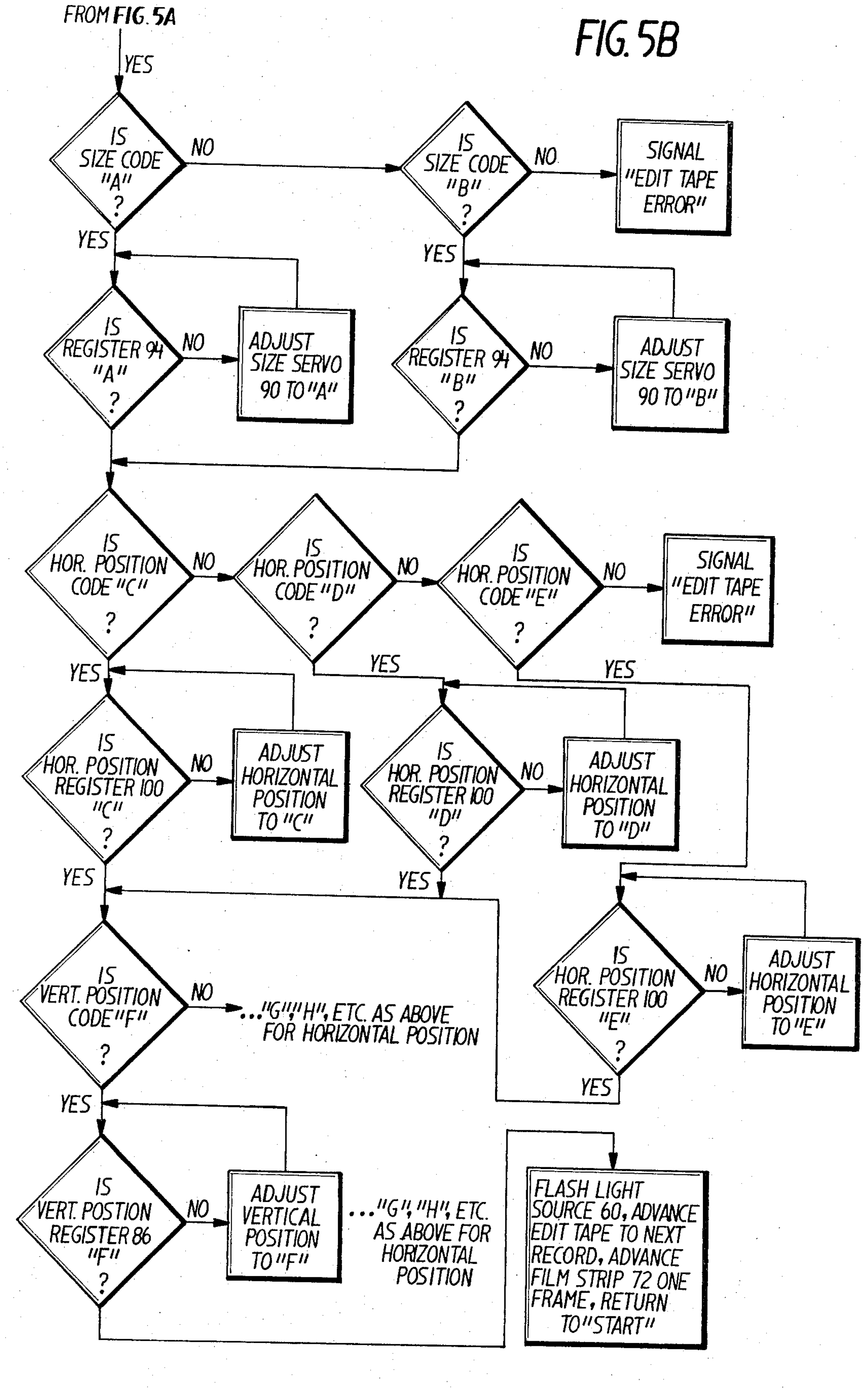

The operation of the computer controlled AGD 32 is best understood by reference to FIG. 5 wherein one possible program for controlling the mini-computer 24 is illustrated in the form of a flow chart. The program illustrated in FIG. 5 is used when the mini-computer 24 is coupled to the system in the manner illustrated in FIG. 1. That is, in the system wherein an edit tape 22 is prepared.

Once the edit tape is prepared, it is mounted on a suitable computer input device to be read into the memory of the mini-computer 24. According to the program, the mini-computer first tests to determine if the edit tape is properly mounted, and is feeding input instructions into the computer. If the edit tape is not properly mounted, and no input signals are being received, the mini-computer generates an "edit tape error" signal. However if the tape is properly mounted, and input signals are properly being received, the mini-computer proceeds to read the first instruction contained on the edit tape into its memory. Each instruction on the edit tape includes four separate information words. The first word is a frame number, indicating the page of the finished text requiring a particular image. The second word indicates the size code. As explained hereinabove, the size code may simply consist of one of two possible alternative sizes. However, it is possible to have a larger number of size variations, where necessary. The third word consists of a location code, which as was also pointed out above, may be limited to approximately six different positions. However, it is also possible to have essentially whatever number of different image locations as are necessary. The last code word consists of an image identification number which identifies a particular aperture card from the aperture card library 28 or graphics deck 30. All of this information is stored in the memory bank of the mini-computer 24.

The mini-computer then tests to determine whether the input card hopper 46 is in position. This instruction is necessary only when the graphics deck 30 is delivered to the ADG 32 housed in a removable hopper portion. Where the graphics deck 30 is automatically delivered from the card sorter 26 to the ADG 32, this instruction may, of course, be suitably modified. If the input hopper is not found to be properly in place, the mini-computer generates an "image card error" signal. If the input card hopper is found to be properly in place, the mini-computer tests to determine if an image card is in the hopper. If no card is found in the hopper, the mini-computer signals "last card processed". However if a card is in the hopper, the mini-computer delivers the first card in the hopper to the reading and projection station 52, while simultaneously removing any card already in the reading and projection station, and delivering it to the processed card hopper 58. The mini-computer then tests to determine if the film reel or magazine 76 is properly mounted in the camera 74. If no film reel is mounted, the mini-computer signals "output film error." However if the output film reel 76 is found to be properly mounted, the computer advances the film strip 72 one frame. This advance in the film strip 72 is monitored by the frame counter 112 and its associated film frame register 114. The mini-computer then tests to determine whether the frame number stored in the frame register 114 is less than the frame number from the edit tape. If the frame number in register 114 is less than the desired frame number, the film strip 72 is advanced until the number in the film frame register 114 is equal to the frame number on the edit tape. If no equality exists, a "film drive error" signal is generated by the computer. If appropriate equality is detected, the mini-computer tests for the image size code stored on the edit tape. The program illustrated in FIG. 5 assumes only two possible size codes. However as is pointed out hereinabove, any number of size codes can be used, and the program can be modified to reflect the various size codes. The size code on the edit tape is then compared with the output of the size register 94, and the size servo 90 is adjusted until the output of the size register 94 corresponds to the size code on the edit tape. Similarly, the mini-computer 24 checks the horizontal and vertical position codes recorded on the edit tape and compares these codes with the numbers stored in the horizontal position register 100 and the vertical position register 86, respectively. If the numbers in the registers do not coincide with the desired codes recorded on the edit tape, the horizontal and vertical servos are respectively adjusted. Once the perameters indicated by all of the registers in the ADG correspond to the codes recorded on the edit tape, the mini-computer flashes the projection light source 60 to expose the appropriate frame of the film strip 72, and to record thereon the appropriately sized and positioned graphical image from the aperture card positioned in the reading and projection station 52. The mini-computer then advances the edit tape to the next record, advances the film strip 72 one frame, and returns to the beginning of its program. In this manner, the ADG cycles through all of the aperture cards in the graphics deck 30 and produces a film strip having the appropriately sized and positioned graphical images recorded thereon.

Naturally, many programming variations may be used to achieve the operations described above. However, all of the operations described above are considered to be relatively routine, and accordingly one skilled in the art of computer programming could easily develop a program for performing the above-described steps. Furthermore, the specific steps described above can be varied, as will be apparent to those skilled in the art, as long as the basic cycle of operations described is carried out.

As was noted hereinabove, the mini-computer 24 may be programmed in a somewhat different manner to eliminate the need for an edit tape. The system illustrated diagrammatically in FIG. 2, for example, illustrates an arrangement in which no edit tape is required.

Figure 6:
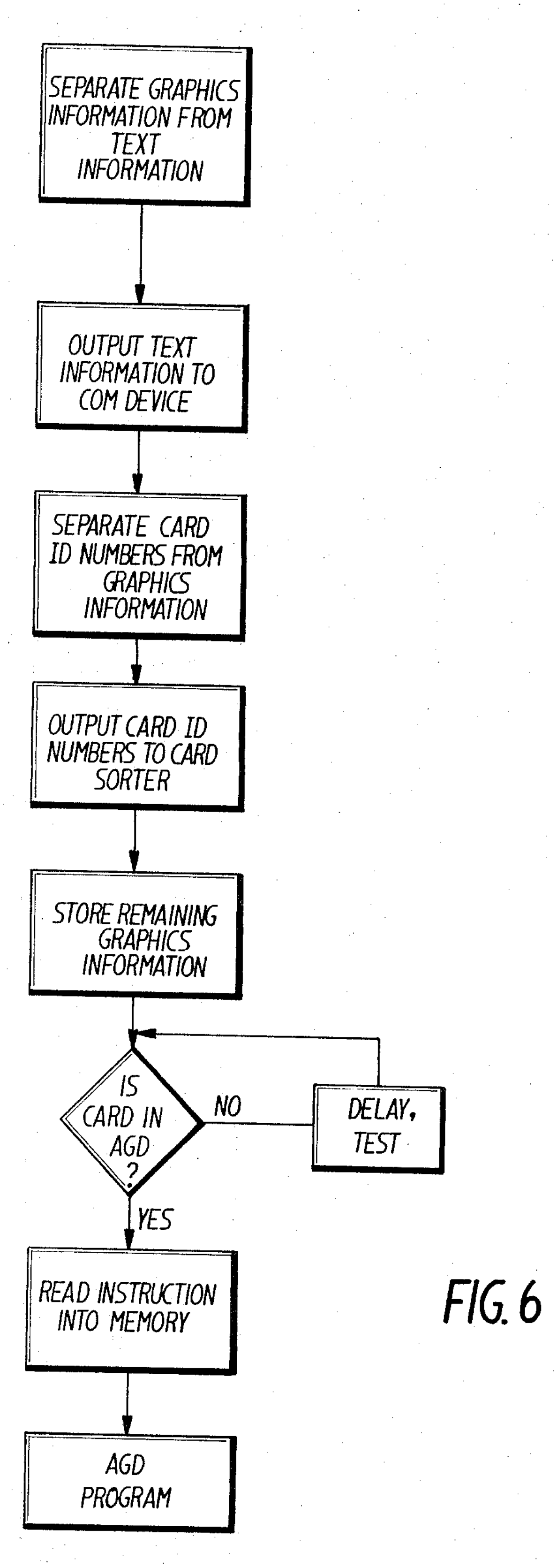

Referring now to FIG. 6, the program necessary to operate the mini-computer in the system shown in FIG. 2 is illustrated in terms of a flow chart. First, the mini-computer 24 receives all input information prepared by the author directly from the computer input device 42. The computer separates the graphical information codes from the textual information in its first processing step. This step is easily accomplished by programming the computer to recognize the format or a specific code relating to the graphics information. Next, the mini-computer passes all necessary textual information to the COM device 16, where the text film 20 is prepared. As the textual information is being fed to the COM device 16, the mini-computer 24 directs aperture card identification numbers to the card sorter 26 for selecting the graphics deck 30. The remaining information pertaining to graphics is stored temporarily. As the input textual and graphical information from the author 10 is fed into the mini-computer 24 the textual and graphical information is progressively separated. Card identification numbers are transmitted to the card sorter 26 as soon as they are recognized by the mini-computer, so that the graphics deck 30 is accumulating as input information is being received from the computer input device 42. The cards selected by the card reader are then preferably automatically delivered to the ADG 32. It is not necessary that the entire graphics deck 30 be assembled before being fed to the ADG 32, in this embodiment of the invention and thus all processing can take place simultaneously. The computer tests to see if a card is in the ADG, and if no card is found therein, the test is repeated after a suitable time delay. If a card is found in the ADG, the mini-computer proceeds to read the first "edit" instruction, that is the first of the stored graphics information. This step corresponds to the second step of the program illustrated in FIG. 5, that is, the step stating "read instruction into memory." Accordingly, the computer may proceed to follow-through the AGD program illustrated in FIG. 5 to prepare a first frame in the graphics film 34. It will be understood, of course, that the AGD program may run simultaneously with the program separating graphical information from textual information. Thus, according to this embodiment of the present invention, the text film 20 and the graphics film 34 may be prepared simultaneously, thereby making the system more economical in terms of time consumed, although somewhat more complex in its programming requirements. Nevertheless, the functional steps which require programming are each relatively simple in nature, and appropriate programming instructions can easily be prepared by a programmer of ordinary skill in the art.

It will be apparent from the foregoing disclosure that various methods and apparatuses for automatically merging textual and graphical materials have been disclosed. Although the overall systems disclosed have been described generally in terms of apparatus components, it will be understood that the function of each element of apparatus defines a step in the method of the present invention. Furthermore, various alternative structures have been disclosed for individual components of the system of the present invention. It will be understood by those skilled in the art that if an alternative structure is selected for one component of the system, other components of the system may also have to be modified or altered in an obvious manner to cooperate with the alternative structure selected for the particular component.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent is:

1. A method of combining textual and graphical matter comprising the steps of:

preparing a master machine readable record having said textual matter and coded information describing said graphical matter recorded thereon, transferring said textual matter from said master record to a first film record, producing a second film record containing said graphical matter described on said master record; and, merging said first and second film records to produce a third film record on which said textual and graphical matter is combined.

2. A method of combining textual and graphical matter as in claim 1, wherein said step of preparing includes the step of:

magnetically recording said textual matter and said coded information on a tape medium.

3. A method of combining textual and graphical matter as in claim 1, wherein said step of preparing includes the step of:

punching said textual matter and said coded information into a machine readable record.

4. A method of combining textual and graphical matter as in claim 1, further comprising the step of:

making printing plates from said third film record.

5. A method of combining textual and graphical matter as in claim 1, wherein said step of producing includes the step of:

selecting graphical information from a storage facility in accordance with said coded information.

6. A method of combining textual and graphical matter as in claim 5, wherein said step of selecting includes the step of:

separating a deck of cards containing graphical images identified by said coded information from a library of cards.

7. A method of combining textual and graphical matter as in claim 5, wherein said step of producing further comprises the step of:

photographically transferring said graphical images onto a continuous film strip.

8. A method of combining textual and graphical matter as in claim 1, wherein said step of producing includes the steps of:

sizing graphical images in accordance with said coded information; and, positioning said sized graphical images on said second film record in accordance with said coded information.

9. A method of combining textual and graphical matter as in claim 1, further comprising the step of:
developing an edit tape containing said coded information from said master record.

10. A method of combining textual and graphical matter as in claim 9, further comprising the step of:
using said edit tape to control said step of producing.

11. A system for combining textual material with graphical material including a plurality of images comprising:
recording means for producing a master record containing said textual material and coded information describing said graphical material,
converting means for automatically producing a first film strip record of said textual material from said master record,
a library of graphical matter,
sorting means for selecting said graphical material described by said coded information from said library of graphical matter,
filming means for producing a second film strip record of said graphical material; and,
film merging means for photographically combining said first and second film strip records onto a final film record, whereby said textual and graphical material is combined.

12. A system for combining textual material with graphical material including a plurality of images as in claim 11, wherein:
said coded information describes the format of said final film record, including the size and orientation of each image included in said graphical material; and,
said filming means includes means for modifying the size and orientation of each image formed on said second film strip record in accordance with said coded information.

13. A system for combining textual material with graphical material including a plurality of images as in claim 12, further comprising:
control means coupled to said converting means, said sorting means and said filming means for controlling the operation of said converting means, said sorting means and said filming means in accordance with said coded information contained in said master record.

14. A system for combining textual material with graphical material including a plurality of images as in claim 13, wherein:
said control means includes a programmable computer.

15. A system for combining textual material with graphical material including a plurality of images as in claim 12, wherein:
said means for modifying the size and orientation of each image includes camera means, and servo means for adjusting the position of said camera along three mutually perpendicular axes.

16. A system for combining textual material with graphical material including a plurality of images as in claim 15 further comprising:
control means for operating said servo means in accordance with said coded information; and
light source means for exposing film contained in said camera in accordance with control signals generated by said control means.

17. A system for combining textual material with graphical material including a plurality of images as in claim 11, further comprising:
second recording means for producing an edit tape from said master tape, said edit tape containing only said coded information describing said graphical material.

18. A system for combining textual material with graphical material including a plurality of images as in claim 17, further comprising:
control means for reading said coded information from said edit tape, said control means coupled to said filming means for controlling said filming means in accordance with said coded information on said edit tape.

* * * * *